US012739206B2

(12) United States Patent
Regmi et al.

(10) Patent No.: US 12,739,206 B2
(45) Date of Patent: Sep. 15, 2026

(54) CONNECTING MULTIPLE MEDIA ZONES

(71) Applicant: Arista Networks, Inc., Santa Clara, CA (US)

(72) Inventors: Sudip Regmi, San Ramon, CA (US); Sakti Arunachalam, Surrey (CA); Satyam Savita, Bangalore (IN); Ryan Morris, Thornhill (CA); Gerard Neale Phillips, Winchester (GB)

(73) Assignee: ARISTA NETWORKS, INC., Santa Clara, CA (US)

( * ) Notice: Subject to any disclaimer, the term of this patent is extended or adjusted under 35 U.S.C. 154(b) by 28 days.

(21) Appl. No.: 18/611,104

(22) Filed: Mar. 20, 2024

(65) Prior Publication Data

US 2025/0300933 A1 Sep. 25, 2025

(51) Int. Cl.
*H04L 47/125* (2022.01)
*H04L 47/2416* (2022.01)

(52) U.S. Cl.
CPC ........ *H04L 47/125* (2013.01); *H04L 47/2416* (2013.01)

(58) Field of Classification Search
CPC .......................... H04L 47/125; H04L 47/2416
See application file for complete search history.

(56) References Cited

U.S. PATENT DOCUMENTS 8,160,072 B1 * 4/2012 Gnanasekaran .... H04L 47/2441 370/468
11,411,855 B1 * 8/2022 Flamini ................. H04L 45/245
2008/0031263 A1 * 2/2008 Ervin .................. H04L 12/4641 370/397
2012/0300776 A1 * 11/2012 Liu ..................... H04L 61/5038 370/409
2015/0172194 A1 * 6/2015 Song ....................... H04L 67/61 370/235
2019/0149456 A1 * 5/2019 Brissette ............. H04L 43/0811 370/225
2020/0328968 A1 * 10/2020 Kanjariya ........... H04L 12/4633
2020/0344127 A1 * 10/2020 Rahman .............. H04L 41/0631
2022/0021586 A1 * 1/2022 Kazmierski ........... H04L 41/344
2022/0231949 A1 * 7/2022 Ramaswamy .......... H04L 45/24
2025/0055830 A1 * 2/2025 Wang .................... H04W 28/02
2025/0126080 A1 * 4/2025 Brar .................... G06F 9/45558

* cited by examiner

*Primary Examiner* — Farzana B Huq
(74) *Attorney, Agent, or Firm* — Fountainhead Law Group, PC

(57) ABSTRACT

AN MCS is provided to select a link between two zones for transmission of traffic. A user (e.g. broadcast controller) in one zone (e.g., Zone 1) configures a virtual link to another zone (e.g., Zone 2). The virtual link comprises a list of edge devices in Zone 1 and physical interfaces on those edge devices that link to Zone 2. The user selects a virtual link for traffic, and the MCS selects one of the constituent links of the selected virtual link to carry the traffic, taking into account load balancing criteria such as traffic flowing on the other links, link bandwidth, link loading, and so on. The MCS alleviates the user having to manage link usage between zones and provides more effective load balancing than simple techniques (e.g., hashing) which can result in hot spots in the fabric.

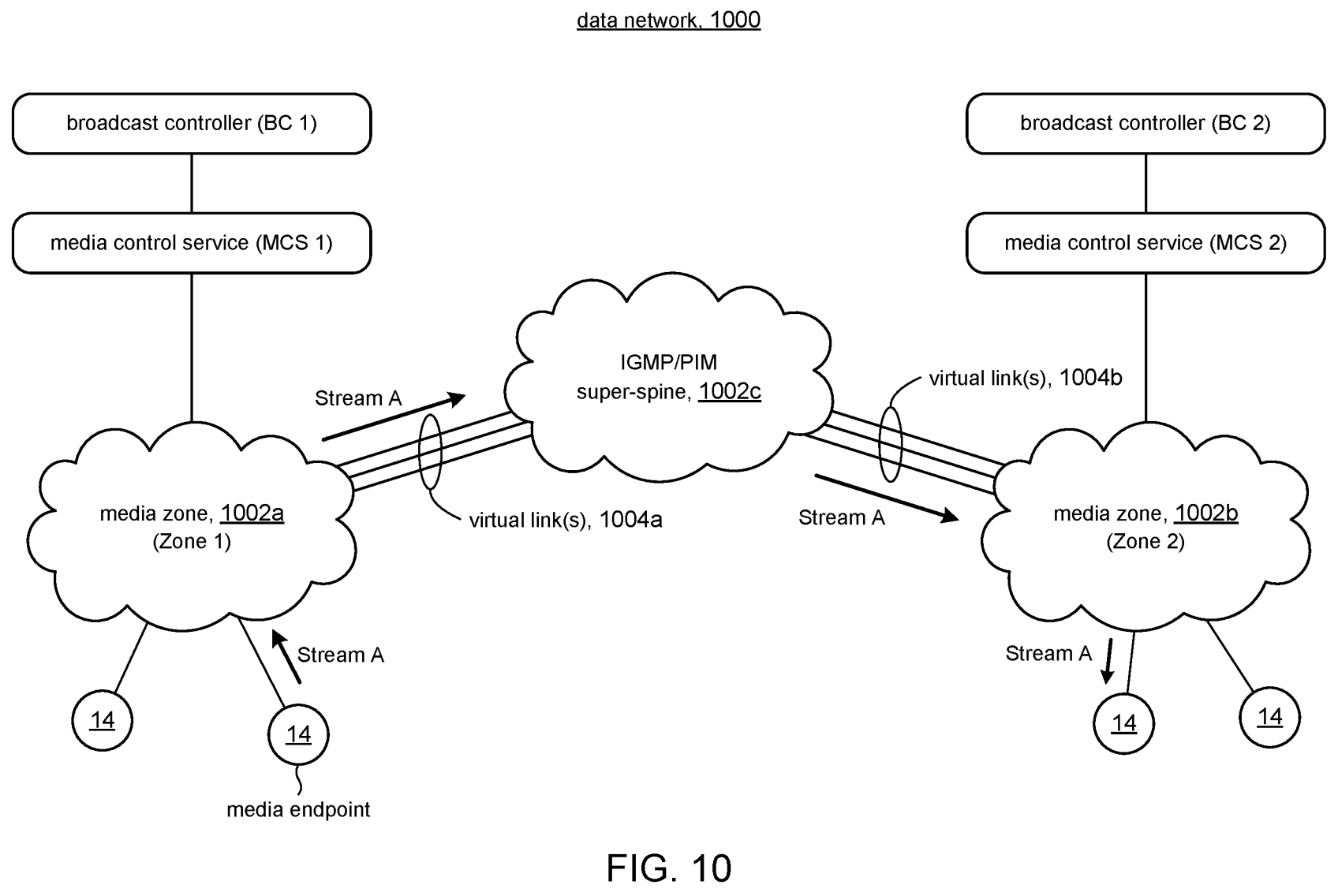

20 Claims, 10 Drawing Sheets data network, 1000 broadcast controller (BC 1)
media control service (MCS 1)
media zone, 1002a
(Zone 1)
14
14
media endpoint
Stream A
Stream A
virtual link(s), 1004a
IGMP/PIM
super-spine, 1002c
virtual link(s), 1004b
Stream A
broadcast controller (BC 2)
media control service (MCS 2)
media zone, 1002b
(Zone 2)
Stream A
14
14

FIG. 10

CONNECTING MULTIPLE MEDIA ZONES

BACKGROUND

The present disclosure is directed to the transmission of multicast traffic between different media zones (e.g., networks). The zones (e.g., spine-leaf architectures) are connected by physical links (links) between devices at the edges of the zones. The goal of media houses and broadcasters is to connect various media zones. As a result, content needs to be sent and received by controllers between these various zones. There is currently no predictable, bandwidth-aware method for broadcast controllers to send/receive content across these various zones.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 10 illustrates a deployment configured in accordance with some embodiments of the present disclosure.

DETAILED DESCRIPTION

Figure 1:
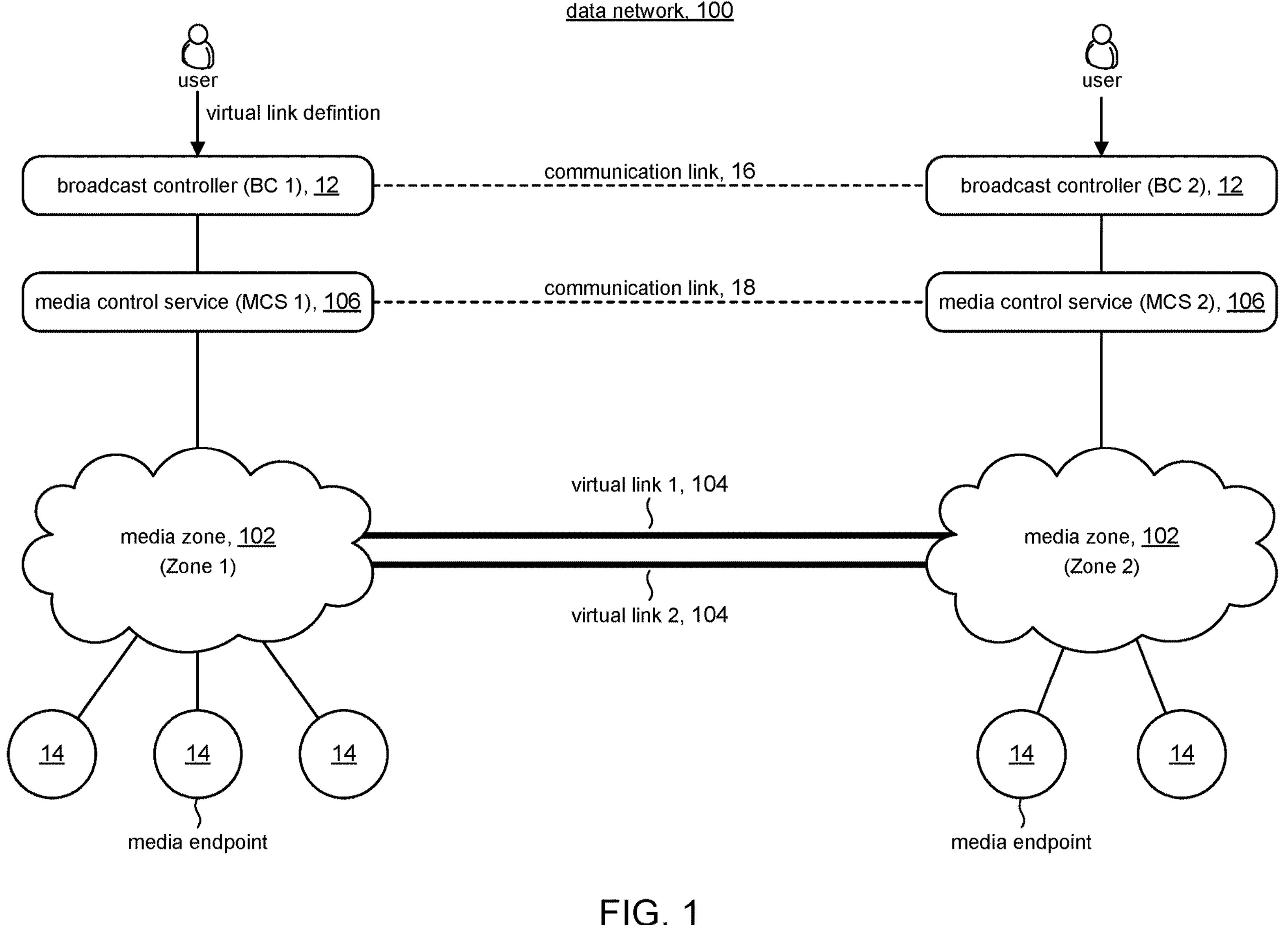
FIG. 1 illustrates a deployment configured in accordance with some embodiments of the present disclosure.

In accordance with the present disclosure, a media control service (MCS) is provided to select a link between two media zones for transmission of traffic. The selection takes into account load balancing criteria such as traffic flowing on the other links, link bandwidth, link loading, and so on. The MCS alleviates the user having to manage link usage between media zones and provides more effective load balancing than simple techniques (e.g., hashing) which can result in hot spots in the fabric.

In accordance with the present disclosure, the MCS allows a controller of multicast data (e.g., video, audio, or any other streaming data) in one media zone (e.g., Zone 1) to configure/define one or more virtual links to another media zone (e.g., Zone 2). Each virtual link comprises a list of edge devices in Zone 1 and physical interfaces on those edge devices that link to Zone 2. The multicast controller can then specify a virtual link for transmission (send or receive) of traffic. To provide context for discussion purposes, the remaining description will use a broadcast controller as a specific example of a multicast controller. It will be appreciated that the present disclosure is applicable in any multicast system. In other embodiments, for example, another multicast use case is a conferencing system where video, audio, and other media can be shared (e.g., by a conference controller) among conference participants. Multicast is used heavily in finance, and so MCS capability can be used in a financial trading platform controller. Still other multicast deployments can be adapted in accordance with the present disclosure.

In accordance with the present disclosure, the MCS can select one of the constituent links of the specified virtual link to carry the traffic, taking into account traffic load, bandwidth capacity, and so on. The MCS prevents the problem of oversubscription between multiple multicast media zones. Consider the following use cases:

Sending Traffic: 1$^{st}$ Zone SENDS TO 2$^{nd}$ Zone

Use Case 1—Zone 1 (1$^{st}$ zone) and Zone 2 (2$^{nd}$ zone) are managed by an MCS (e.g., MCS 1, MCS 2):

- Broadcast controller (BC 1) in Zone 1 instructs MCS 1 to send a stream (flow) over a virtual link, which represents several physical links to Zone 2.
- MCS 1 selects one of the physical links that constitute the specified virtual link, based on load balancing criteria.
- MCS 1 informs the selected link to BC 1. BC 1 informs the selected link to BC 2.
- In another embodiment, MCS 1 can directly inform the selected link to MCS 2.
- BC 2 informs the link to MCS 2. MCS 2 now knows the link on which the stream will arrive from Zone 1.

Use Case 2—Zone 1 (1$^{st}$ zone) is managed by an MCS, and Zone 2 (2$^{nd}$ zone) is an Internet Group Management Protocol (IGMP) media zone:

- BC 1 instructs MCS 1 to send a stream over a virtual link, which represents several physical links to Zone 2.
- MCS 1 selects one of the links that constitute the specified virtual link, based on load balancing criteria.
- MCS 1 begins to send a flow on the selected link. The flow is registered in Zone 2, per normal processing of a Protocol Independent Multicast (PIM) Border router in Zone 2 and so becomes available to the IGMP system.
- IGMP will receive the stream on the selected link and route the stream per IGMP routing to the destination.

Receiving Traffic: 1$^{st}$ Zone RECEIVES FROM 2$^{nd}$ Zone

Use Case 1—Zone 1 (1$^{st}$ zone) and Zone 2 (2$^{nd}$ zone) are managed by an MCS (e.g., MCS 1, MCS 2):

- When BC 1 wants to receive a stream from Zone 2, BC 1 can signal BC 2 that it wants to receive a stream from Zone 2. Processing by BC 2 in Zone 2 proceeds as described above in connection with Use Case 1, but with the roles of BC 1 and BC 2 reversed.

Use Case 2—Zone 1 (1$^{st}$ zone) is managed by an MCS, and Zone 2 (2$^{nd}$ zone) is an IGMP media zone:

BC 1 tells MCS 1 to receive a stream over a virtual link, which represents several physical links to Zone 2.

MCS 1 selects, based on load balancing criteria, one of the links that constitute the specified virtual link.

The selected link will trigger an IGMP host proxy event in Zone 1 that is received by the IGMP PIM subsystem in Zone 2, and trigger the specified flow to be delivered across the required link.

IGMP will route the stream per IGMP routing over the selected link to Zone 1.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a high level diagram illustrating an example of a data network 100 for multimedia traffic that can embody the techniques in accordance with the present disclosure. Embodiments in accordance with the present disclosure can be deployed in any suitable network. For discussion purposes, data network 100 comprises two media zones 102. Each media zone 102 comprises a network of network devices; e.g., switches, routers, edge devices, firewalls, etc. Each media zone 102 can be based on any suitable network architecture such as, for example, a spine-leaf configuration.

Media zones 102 support multimedia traffic between media endpoints 14, including for example between media endpoints within a media zone and media endpoints between media zones. A media endpoint can be a data source or a data sink. For example, a camera can be a data source, and a user computer can be a data sink that receives video from the camera. For purposes of explaining embodiments in accordance with the present disclosure, examples will consider the transmission of traffic between a media endpoint in Zone 1 and a media endpoint in Zone 2.

Traffic across media zones 102 can be supported by virtual links 104 defined in accordance with the present disclosure. FIG. 1, for example, shows two virtual links (virtual link 1, virtual link 2) between Zone 1 and Zone 2. As explained in more detail below, virtual links in accordance with the present disclosure facilitate optimizing the allocation of communication resources between media zones, such as Zone 1 and Zone 2.

At the user level, each media zone 102 can be managed by a broadcast controller 12. The illustrative example shown in FIG. 1 shows a broadcast controlled BC 1 in Zone 1 and a broadcast controller BC 2 in Zone 2. A user using broadcast controller 12 can control the connection(s) between media endpoints 14; for example, connecting a camera in one media zone to a computer in another zone. A user using a broadcast controller can specify which virtual link 104 to use for transmission of media across media zones. Broadcast controllers 12 can be linked together (e.g., communication link 16) to coordinate connecting media end points, tearing down the connections, and so on.

At the network level, each media zone 102 can be managed in accordance with the present disclosure by a media control services (MCS) controller 106. An MCS controller can facilitate the conversion of broadcast operations of a broadcast controller to network operations. Broadcast controllers can integrate with the MCS controller to provision multicast streams required to support multimedia traffic between media zones. The illustrative example shown in FIG. 1 shows BC 1 interfacing with MCS 1 in Zone 1 to provision and manage multicast streams in Zone 1. Likewise, BC 2 in Zone 2 interfaces with MCS 2 to provision and manage multicast streams in Zone 2. As explained below, MCS controller 106 in accordance with the present disclosure can optimize resource utilization of the connection between two media zones. In some embodiments, MCS controllers 106 can be linked together; e.g., communication link 18.

Figure 2:
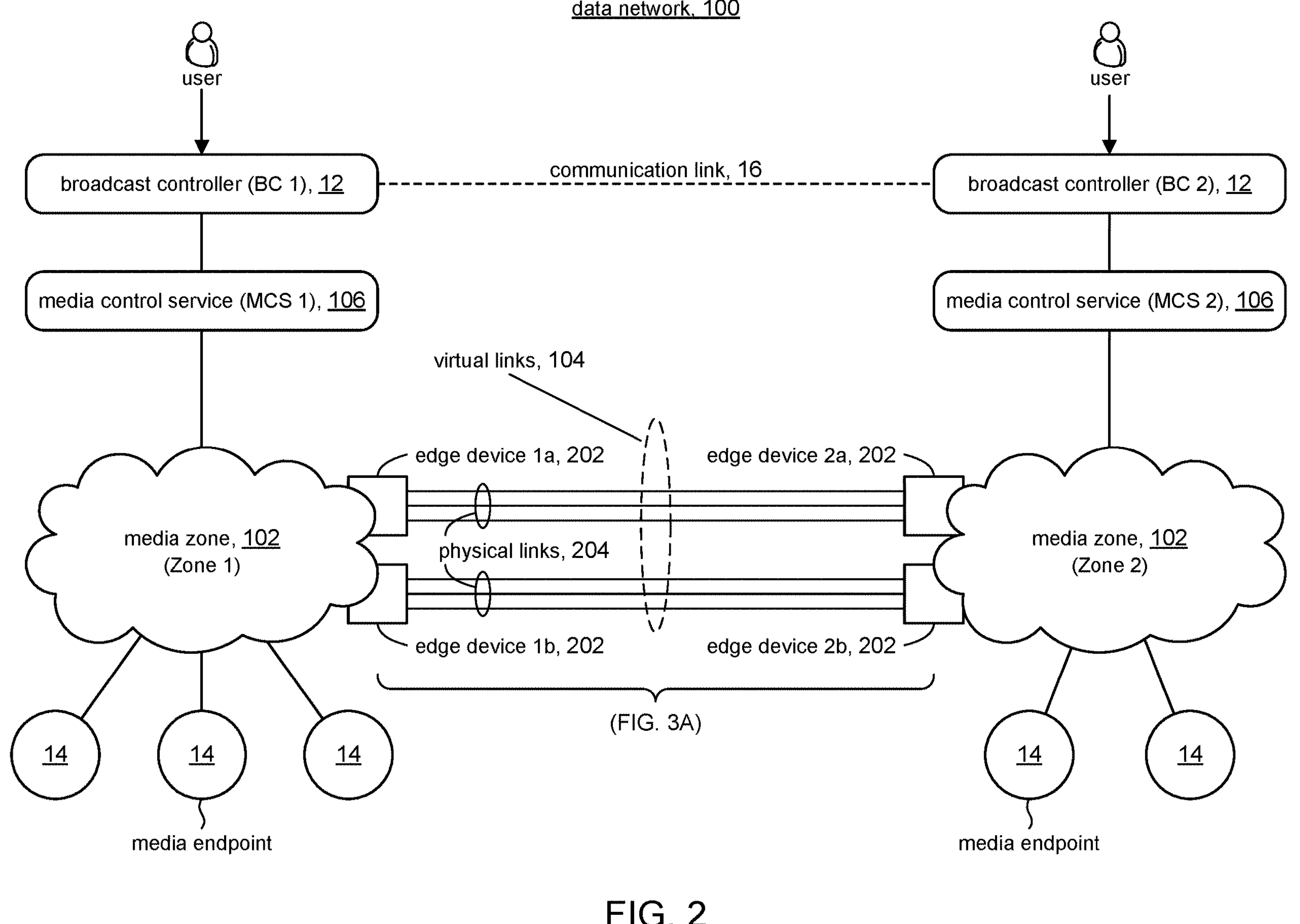
FIG. 2 shows details of the virtual links shown in FIG. 1 in accordance with some embodiments of the present disclosure.

FIG. 2 illustrates additional details of the communication links between two media zones 102; e.g., Zone 1 and Zone 2. Each media zone includes one or more zone edge devices 202 for communication between media zones. FIG. 2, for example, shows Zone 1 includes edge devices 1*a*, 1*b* connected to edge devices 2*a*, 2*b* in Zone 2. The connection comprises physical links 204 (e.g., electrical cables, fiber optic cables, etc.) between the edge device 202.

Figures 3A, 3B:
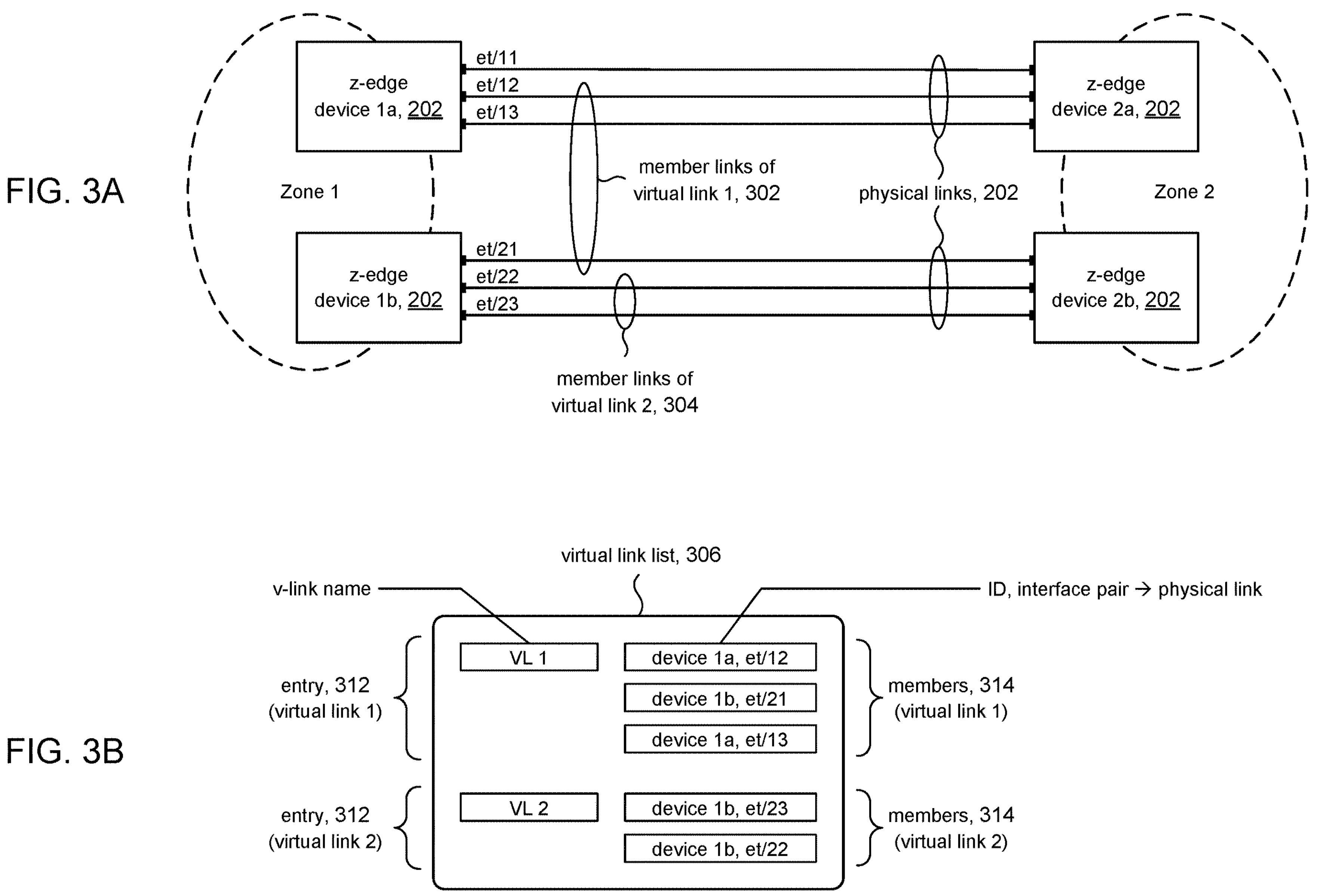
FIG. 3A shows additional details of the virtual links shown in FIG. 1 in accordance with some embodiments of the present disclosure.
FIG. 3B is a representation of a virtual link list table in accordance with the present disclosure.

FIGS. 3A and 3B illustrate examples of virtual links in accordance with the present disclosure, using the examples illustrated in FIGS. 1 and 2. A virtual link between two media zones in accordance with the present disclosure represents a group of physical links that connects one media zone to another media zone. FIG. 3A, for example, shows edge devices 1*a*, 1*b* in Zone 1 and edge devices 2*a*, 2*b* in Zone 2. Edge device 1*a* in Zone 1 is connected to edge device 2*a* in Zone 2 via physical links 202, which are connected to interfaces et/11, et/12, et/13 on edge device 1*a*. Likewise, edge device 1*b* in Zone 1 is connected to edge device 2*b* in Zone 2 via physical links 202, which are connected to interfaces et/21, et/22, et/23 on edge device 1*b*.

A virtual link in accordance with the present disclosure can represent or otherwise comprise a group physical links connected to one edge device or across multiple edge devices. In accordance with some embodiments of the present disclosure, a virtual link is generally defined relative to a media zone. For example, a user in Zone 1 will request virtual links defined in Zone 1. As such the physical links of a virtual link in a given media zone can be identified or otherwise referenced relative to their connections to the devices/interfaces in that media zone. For example, supposing that the virtual link list 306 is defined by a user in Zone 1, the members of virtual link 1 can be identified with respect to their connections to edge devices 1*a* and 1*b* in Zone 1, and likewise members of virtual link 2 can be identified with respect to their connections to edge device 1*b* in Zone 1. Virtual link 1, for example, represents a group of physical links 302 across two edge devices, namely edge device 1*a* and edge device 1*b*. The physical links in group 302 are connected to interfaces et/12 and et/13 on edge device 1*a* and interface et/22 on edge device 1*b*. Virtual link 2 represents an example of a virtual link comprising a group of physical links 304 on one edge device, namely edge device 1*b*, which are connected to interfaces et/22 and et/23 on edge device 1*b*.

FIG. 3B shows a table of virtual links, virtual link list 306. The virtual link list 306 represents a list of virtual links defined by a user. Each entry 312 in the virtual link list 306 represents a virtual link. Each virtual link can be identified by a virtual-link name and a member list 314 of physical links that constitute the virtual link, where each member can be identified by the edge device and an interface on that edge device to which the member is connected. The virtual link list 306 shown in FIG. 3B, for example, comprises virtual link 1 and virtual link 2 shown in FIG. 3A. Virtual link 1 is identified in the virtual link list as VL 1 and comprises a group of three members 314 that represent the physical links of VL 1, and virtual link 2 is identified in the virtual link list as VL 2 and comprises a group of two members. The physical links that constitute a virtual link can be listed in priority order. This aspect of the present disclosure is discussed below.

Figure 4:
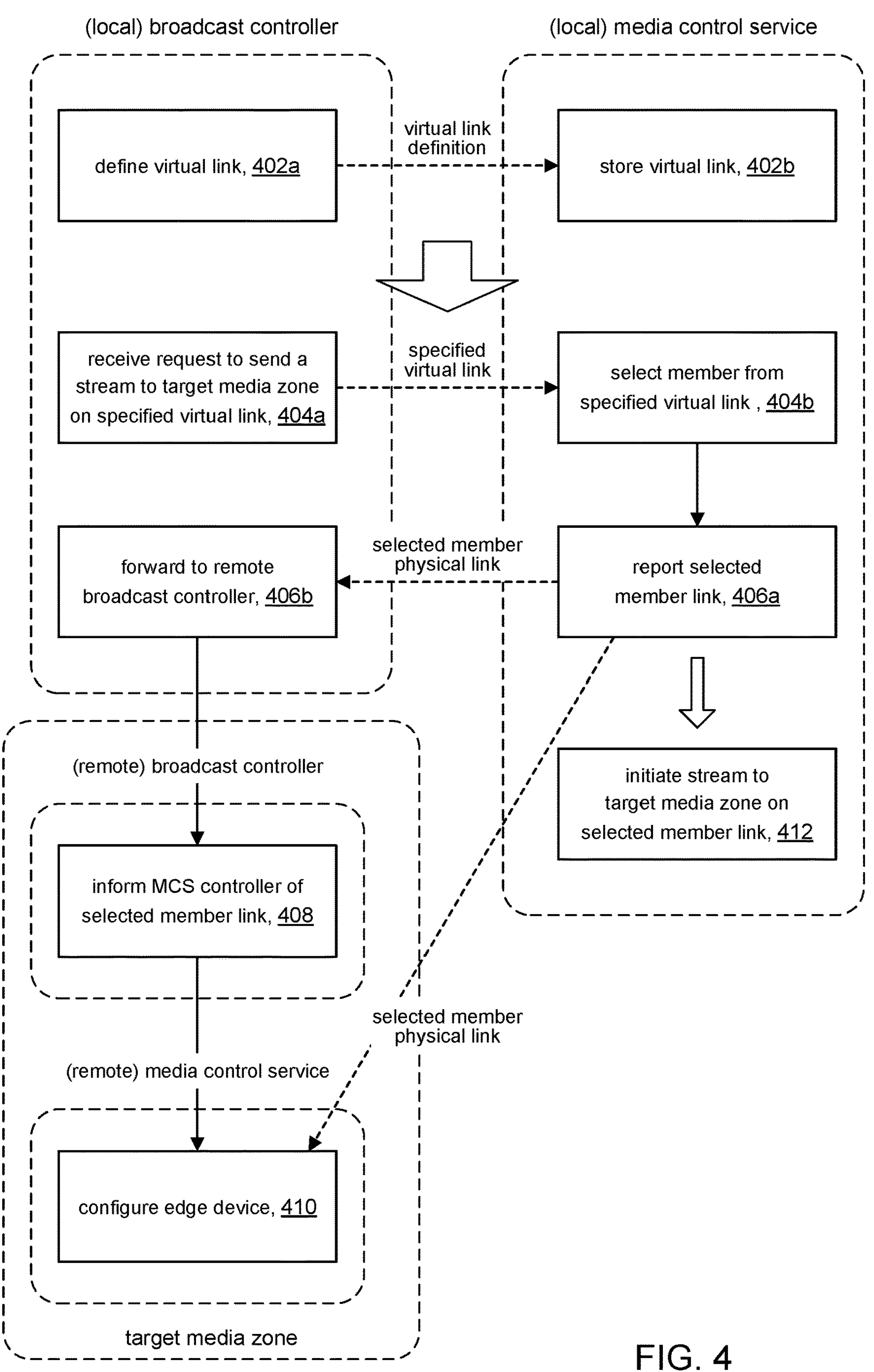
FIG. 4 represents processing to set up streaming in accordance with some embodiments of the present disclosure.

Referring to FIG. 4, the discussion will now turn to a high level description of processing in a broadcast controller (BC) and a media control service (MCS) for setting up a stream (flow) in accordance with the present disclosure. In some embodiments, for example, each of the BC and the MCS can include respective computer executable program code (e.g., stored on a non-transitory computer-readable storage memory device), which when executed by a respective processor (e.g., 502, FIG. 2), can cause the BC and MCS to perform respective processing in accordance with FIG. 4. The operation and processing blocks described below are not necessarily executed in the order shown. Operations can be combined or broken out into smaller operations in various embodiments. Operations can be allocated for execution among one or more concurrently executing processes and/or threads. The description will refer to the example configuration shown in FIGS. 1, 2, and 3A and 3B to illustrate the operations.

Virtual Link Definition

At operation 402*a*, a broadcast controller in a media zone can receive input from a user in that media zone to define a virtual link to another zone; e.g., as part of configuring their network. Consider, for example, a user in Zone 1. In some embodiments, the user can access BC 1 in Zone 1 via a suitable user interface to define a virtual link to Zone 2. The user can define a virtual link between Zone 1 and Zone 2 in terms of the physical links between Zone 1 and Zone 2. As explained above, the physical links of a virtual link can be identified with respect to their connections to edge devices in their media zone. For example, the user in Zone 1 can specify a virtual link (virtual link 1) comprising physical links that are connected to interfaces et/12 and et/13 (edge device 1*a*) and interface et/21 (edge device 1*b*). BC 1 can inform MCS 1 of the virtual link definition.

At operation 402*b*, a media control service controller can receive the virtual link definition, originating from a user, from the broadcast controller. In our example, for instance, BC 1 can communicate the definition of virtual link 1 specified by the user to MCS 1. MCS 1 can store the received definition of virtual link 1 in a suitable data store, for example, virtual link list 306. At this point, the virtual link is defined and ready for use.

Virtual Link Utilization

At operation 404*a*, the broadcast controller in the (source) media zone can receive a request from a user to send a stream from a media endpoint 14 in the source media zone to a media endpoint in another (target) media zone. In accordance with the present disclosure, the user need only specify a virtual link between the two media zones, and does not have to select a physical link on which to send the stream. In our example, a user on BC 1 in Zone 1 can specify to send a stream to Zone 2 over virtual link 1. BC 1 can instruct MCS 1 to send the stream to Zone 2 over virtual link 1.

At operation 404*b*, the media control service (MCS) controller in the source media zone can receive the stream details (e.g., source and destination IP addresses, etc.) and the user-specified virtual link from the broadcast controller, where the virtual link represents a group of physical links between the source and target media zones. In our example, for instance, MCS 1 receives from BC 1 the user-specified virtual link 1. In accordance with the present disclosure, MCS 1 in response can select one of the member physical links that constitute virtual link 1. In accordance with some embodiments, for example, MCS 1 can select a member from the group based on load-balancing criteria, including for example link bandwidth, number of streams on a given link, and so on. Other factors may include, but are not limited to, device identifier (e.g., media access control, MAC, address), flow-prioritization, quality of service (QOS) criteria, and so on. For discussion purposes, suppose MCS 1 selects the physical link connected to interface et/21 on edge device 1*b*.

At operation 406*a*, the MCS controller can report the selected physical link. In some embodiments for example, the MCS controller can report the selected physical link to the broadcast controller. In our example, for instance, MCS 1 can report the selected physical link to BC 1. Alternatively, in accordance with some embodiments, MCS 1 can report the selected physical link directly to the (remote) MCS controller in the target media zone. In our example, for instance, operation 406*a* in FIG. 4 represent the two options where (1) MCS 1 can report the selected physical link to BC 1 and/or (2) MCS 1 can report the selected physical link to MCS 2 (e.g., the link can be identified via a notification channel that MCS 2 can subscribe to).

At operation 406*b*, in an embodiment where the MCS controller reports the selected physical link to the broadcast controller, the broadcast controller can forward (e.g., via communication link 16) the selected physical link received from the MCS controller to the (remote) broadcast controller in the target media zone. In our example, for instance, BC 1 in Zone 1 can forward the selected physical link to BC 2 in Zone 2.

At operation 408, the remote broadcast controller in the target media zone can inform the corresponding MCS controller in Zone 2 to route the specified stream to the destination. In our example, for instance, BC 2 can inform MCS 2 to expect the stream to come in on the selected physical link and route the stream to the destination.

At operation 410, the remote MCS controller in the target media zone, in response to receiving the selected physical link from the broadcast controller in the target media zone (or directly from the MCS controller in the source media zone) can configure the edge device connected to the selected physical link to forward the stream to the destination. In our example, for instance, MCS 2 can program the interface on edge device 2*b* that is connected to the selected physical link to forward the stream to the destination.

At operation 412, the MCS controller in the source media zone can initiate a stream that constitutes the multicast traffic to the target media zone on the interface corresponding to the selected physical link, which in our use case is interface et/21 on edge device 1*b*.

It can be appreciated that, in accordance with the present disclosure, the media control service controller (e.g., MCS 1) is responsible for selecting a physical link on which to send traffic out of the media zone. The user need only specify which virtual link to send the stream on, and the system (MCS controller) can select the specific physical link on which to send the stream. By pushing the selection effort down from the user to the MCS controller, embodiments in accordance with the present disclosure can provide load-balancing of traffic on the way out of the media zone without involving the user, thus alleviating the user of that responsibility. The MCS controller can provide more effective load-balancing than a user can because the MCS controller has access to all the configuration information and real-time state information with which to make the decision.

Figure 5:
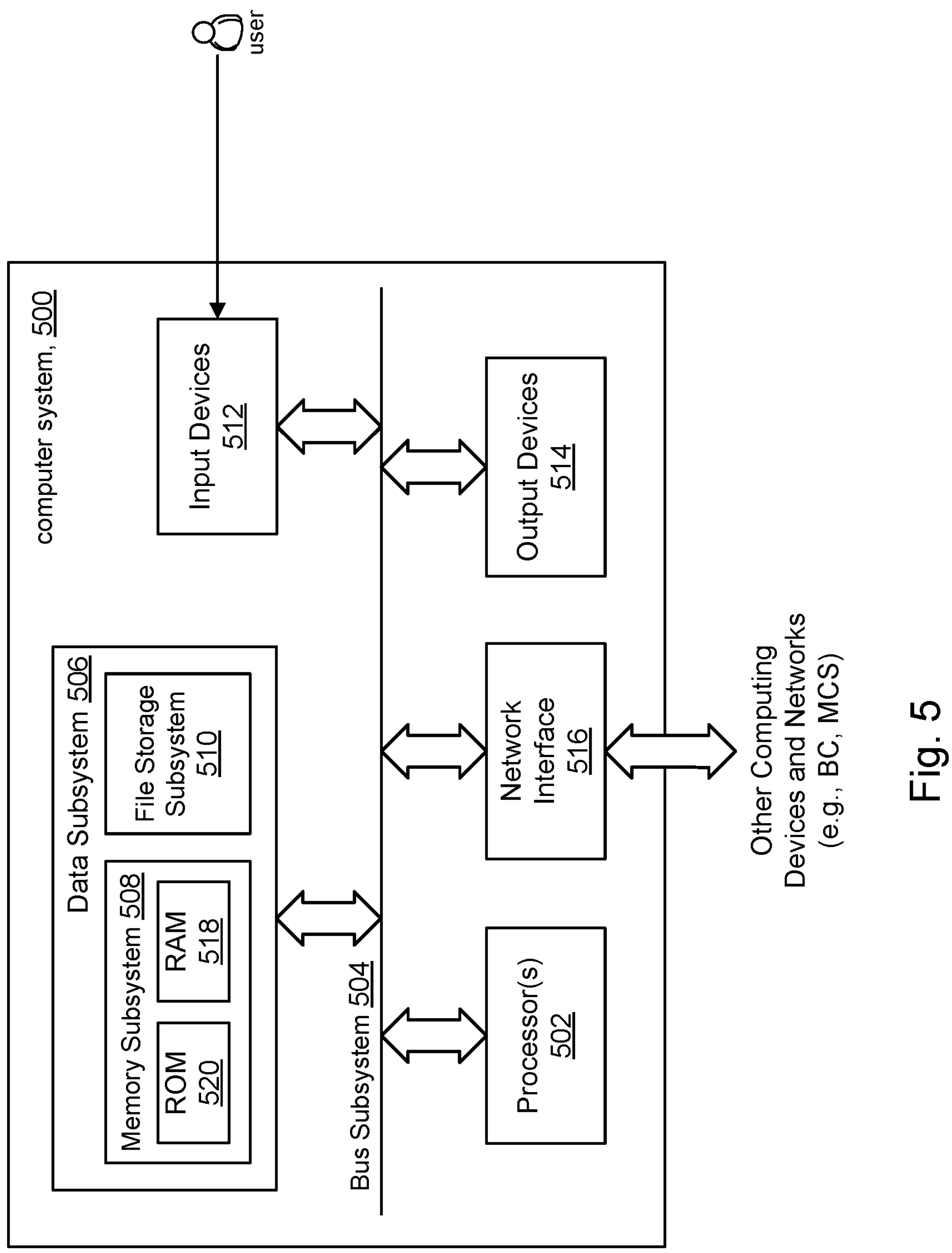
FIG. 5 is a block diagram representation of a computing system adapted in accordance with the present disclosure.

FIG. 5 depicts a simplified block diagram of an example computer system 500 (e.g., broadcast controller, MCS controller) according to certain embodiments. In some embodiments, computer system 500 includes one or more processors 502 that communicate with a number of peripheral devices via bus subsystem 504. These peripheral devices include data subsystem 506 (comprising memory subsystem 508 and file storage subsystem 510), user interface input devices 512, user interface output devices 514, and network interface subsystem 516.

Bus subsystem 504 can provide a mechanism that enables the various components and subsystems of computer system 500 to communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other devices; e.g., network devices, client computing devices for remote access, etc. Embodiments of network interface subsystem 516 can include, e.g., an Ethernet card, a Wi-Fi and/or cellular adapter, and/or the like. Local access to computer system 500 can be provided via input devices 512 (e.g., keyboard, pointing devices, etc.) and output devices 514 (e.g., a computer monitor, etc.).

Data subsystem 506, comprising memory subsystem 508 and file/disk storage subsystem 510, represents non-transitory computer-readable storage media that can store program code and/or data, which when executed by processor 502, can cause processor 502 to perform operations in accordance with embodiments of the present disclosure.

Memory subsystem 508 includes memory circuits such as main random access memory (RAM) 518 for storage of instructions and data during program execution and read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Figure 6:
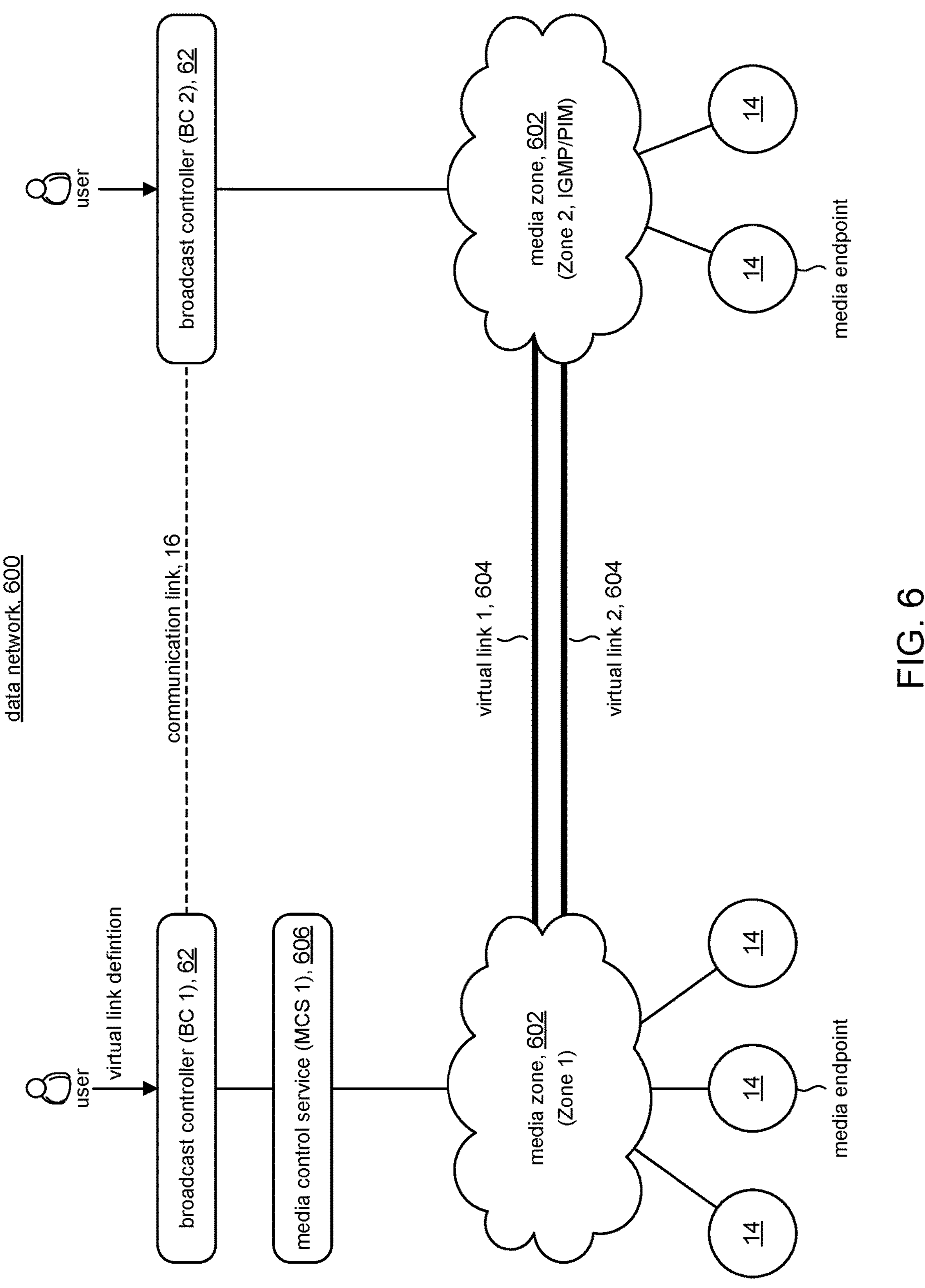
FIG. 6 illustrates a deployment configured in accordance with some embodiments of the present disclosure.

FIG. 6 is a high level diagram illustrating a data network 600 in accordance with some embodiments of the present disclosure wherein a first media zone is supported by a media control service and a second media zone is not supported by a media control service. Data network 600 comprises two media zones 602, Zone 1 and Zone 2. Traffic across media zones 602 can be supported by virtual links 604 defined in accordance with the present disclosure. FIG. 6, for example, shows two virtual links (virtual link 1, virtual link 2) between Zone 1 and Zone 2.

Zone 1 includes a broadcast controller 62 (BC 1) that interacts with MCS controller 602 (MCS 1) to provision and manage multicast traffic in Zone 1 on behalf of BC 1. Zone 2, on the other hand, does not include an MCS controller. Rather, broadcast controller BC 2 manages traffic flows in Zone 2 directly. In some embodiments, for example, Zone 2 can be based on dynamic multicast routing protocols such as Internet Group Management Protocol (IGMP) and Protocol Independent Multicast (PIM) to manage and deliver multicast traffic.

Figure 7:
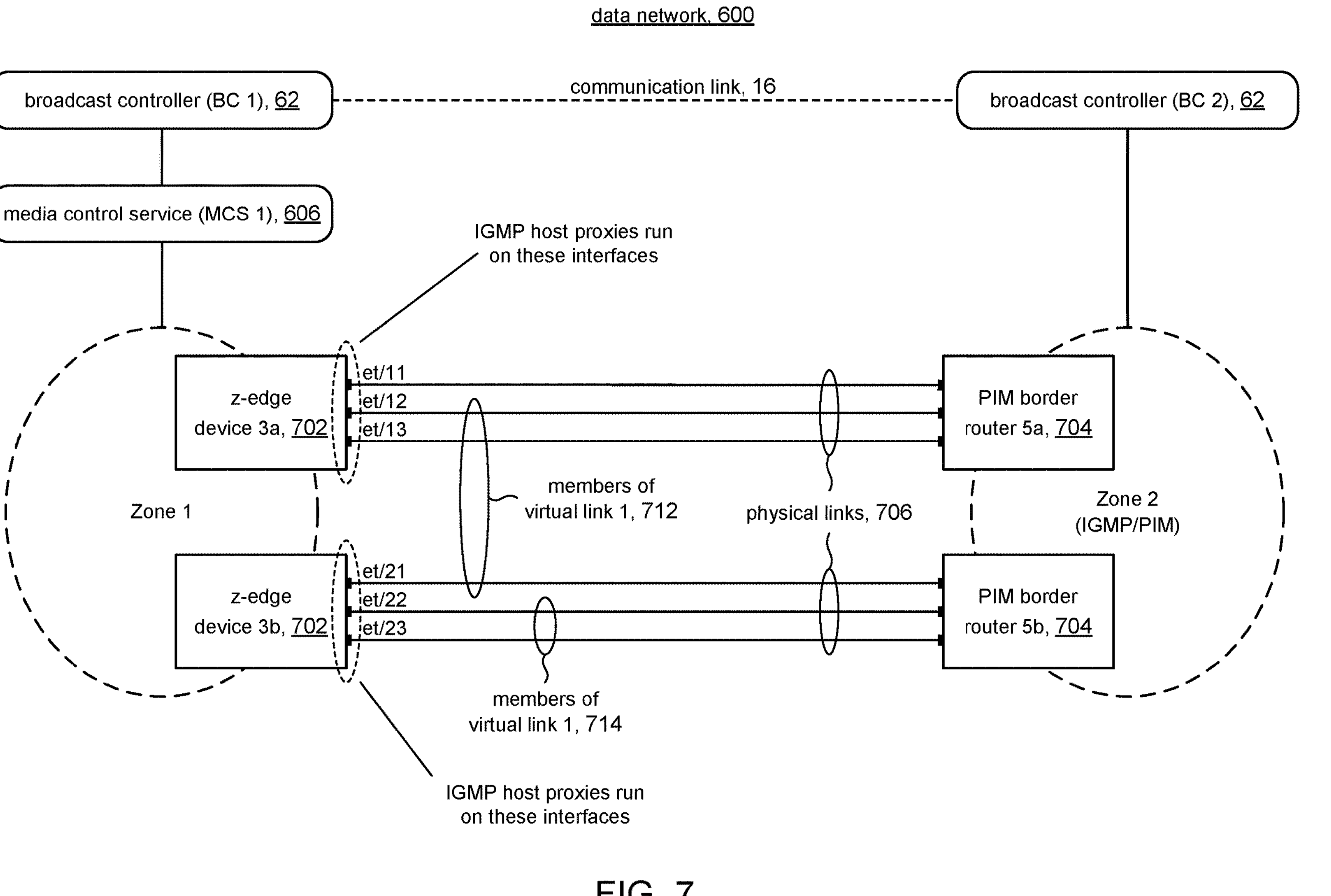
FIG. 7 shows details of the virtual links shown in FIG. 1 in accordance with some embodiments of the present disclosure.

FIG. 7 illustrates additional details of the communication links between two media zones 602; e.g., Zone 1 and Zone 2. Each media zone includes one or more zone edge devices 702, 704 for communication between media zones. FIG. 7, for example, shows Zone 1 includes edge device 702 connected to edge devices 704 in Zone 2 that have PIM multicast border router functionality enabled. The connection comprises physical links 706 (e.g., electrical cables, fiber optic cables, etc.) between the edge devices 702, 704. Virtual link 1 comprises a group of member links 712, and virtual link 2 comprises a group of member links 714

In accordance with some embodiments, PIM border routers 704 in Zone 2 (a PIM domain) connect to non-PIM networks such as Zone 1. Further in accordance with some embodiments, interfaces on edge device 702 that connect to the PIM border routers 704 can be configured with respective IGMP host proxies. An IGMP host proxy allows an edge device 702 in Zone 1 to join a multicast group in Zone 2. FIG. 7, for example, illustrates that interfaces et/11, et/12, and et/13 on edge device 3*a* in Zone 1 each runs an instance of an IGMP host proxy in order to communicate with PIM border router 5*a* in Zone 2. Likewise, interfaces et/21, et/22, and et/23 on edge device 3*b* in Zone 1 each runs an instance of an IGMP host proxy in order to communicate with PIM border router 5*b* in Zone 2.

Figure 8:
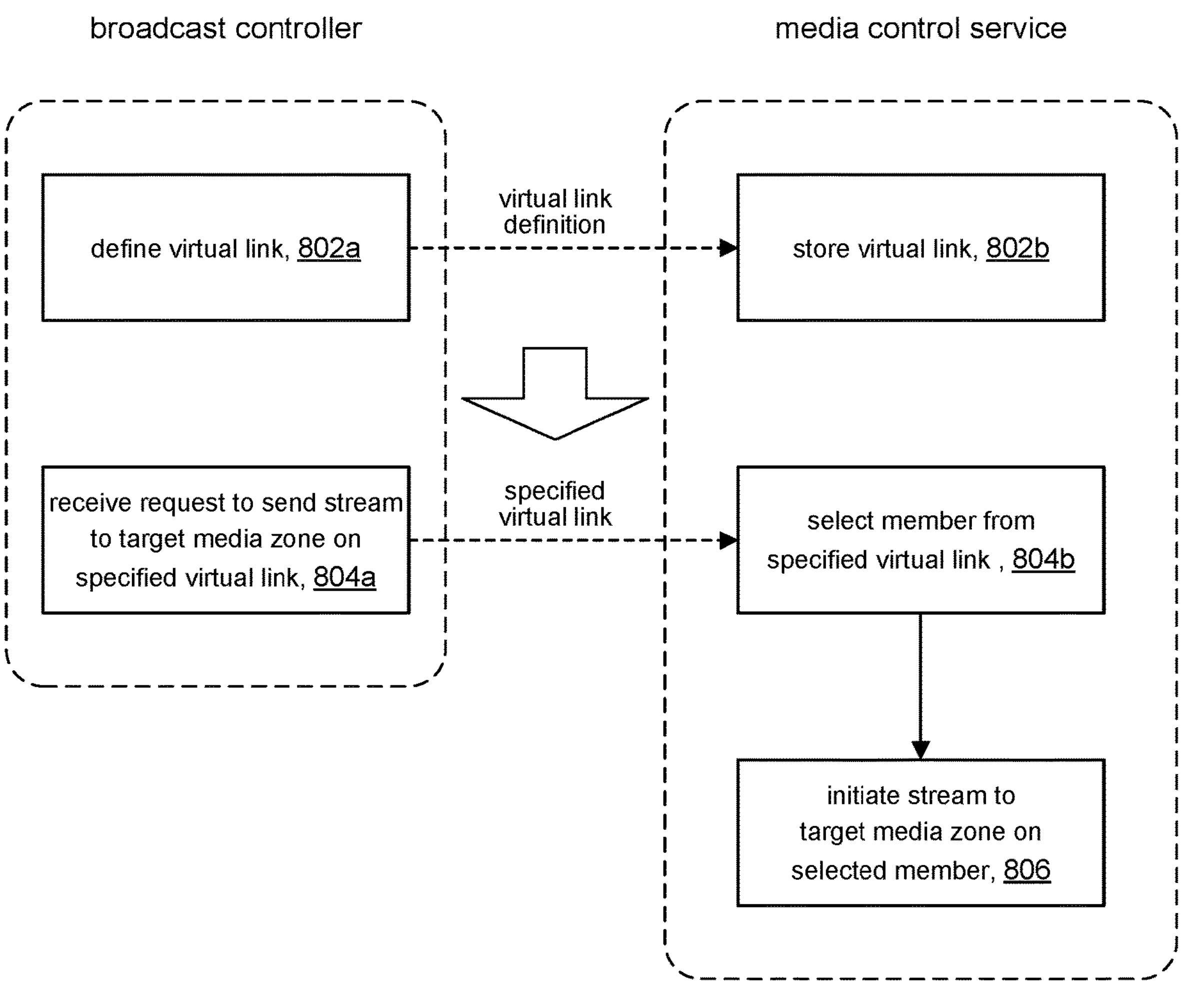
FIG. 8 represents processing for sending a stream in accordance with some embodiments of the present disclosure.

Referring to FIG. 8, the discussion will now turn to a high level description of processing in a broadcast controller (BC) and a media control service (MCS) for sending a stream to an IGMP/PIM-based media zone in accordance with the present disclosure. In some embodiments, for example, each of the BC and the MCS can include respective computer executable program code (e.g., stored on a non-transitory computer-readable storage memory device), which when executed by a respective processor (e.g., 502, FIG. 2), can cause the BC and MCS to perform respective processing in accordance with FIG. 8. The operation and processing blocks described below are not necessarily executed in the order shown. Operations can be combined or broken out into smaller operations in various embodiments. Operations can be allocated for execution among one or more concurrently executing processes and/or threads. The description will refer to the example IGMP/PIM configuration shown in FIGS. 6 and 7 to illustrate the operations.

Virtual Link Definition

At operation 802*a*, a broadcast controller in a media zone can receive input from a user in that media zone to define a virtual link to another zone. Consider, for example, a user in Zone 1. In some embodiments, the user can access BC 1 in Zone 1 to define a virtual link to Zone 2. The user can define a virtual link between Zone 1 and Zone 2 in terms of the physical links between Zone 1 and Zone 2. For example, the user can specify a virtual link, namely virtual link 1, comprising the physical links in Zone 1 that are connected to interfaces et/12 and et/13 (edge device 3*a*) and interface et/21 (edge device 3*b*). BC 1 can provide this virtual link definition to MCS 1.

At operation 802*b*, an MCS controller in the media zone can receive input, originating from a user, that defines a virtual link in accordance with the present disclosure. In our example, for instance, BC 1 can communicate the definition of virtual link 1 specified by the user to MCS 1. MCS 1 can store the received definition of virtual link 1 in a suitable data store, for example, virtual link list 306.

Virtual Link Utilization

At operation 804*a*, the broadcast controller in the (source) media zone can receive a request from a user to send a stream to another (target) media zone. In accordance with the present disclosure, the user need only specify a virtual link between the two media zones which represents two or more physical links between the two media zones. In our example, a user on BC 1 in Zone 1 can specify to send a stream to Zone 2 over virtual link 1. BC 1 can instruct MCS 1 to send the stream to Zone 2 over virtual link 1, where virtual link 1 represents physical links connected to interfaces et/12 and et/13 on edge device 3*a* and interface et/21 on edge device 3*b*.

At operation 804*b*, the MCS controller in the source media zone can receive the stream details and the user-specified virtual link from the broadcast controller, where the virtual link represents a group of physical links between the two media zones. In our example, for instance, MCS 1 receives from BC 1 the user-specified virtual link 1. In accordance with the present disclosure, MCS 1 in response can select one of the member physical links that constitute virtual link 1. In accordance with some embodiments, for example, MCS 1 can select a member from the group based on load-balancing criteria, including for example link bandwidth, number of streams on a given link, etc. For discussion purposes, suppose the selected physical link is the physical link connected to interface et/21 on edge device 3*b*.

At operation 806, the MCS controller in the source media can simply initiate transmission of traffic toward the target media zone on the selected physical link. In our use case, the selected physical link is interface et/21 on edge device 3*b*, targeting Zone 2. Traffic transmitted by a media endpoint in Zone 1 is received in Zone 2 by edge device 5*b* with PIM border router functionality enabled. The flow is registered in Zone 2 per normal processing of PIM border router 5*b* in Zone 2. The edge device 5*b* then treats the received traffic as locally sourced traffic for further routing to the destination.

It can be appreciated that, in accordance with the present disclosure, the media control service controller (e.g., MCS 1) is responsible for selecting a physical link on which to send traffic out of the media zone. By pushing the selection effort down from the user to the MCS controller, embodiments in accordance with the present disclosure can provide load-balancing of traffic on the way out of the media zone without involving the user, thus alleviating the user of that responsibility. The MCS controller can provide more effective load-balancing than a user can because the MCS controller has access to all the configuration information and real-time state information with which to make the decision.

Figure 9:
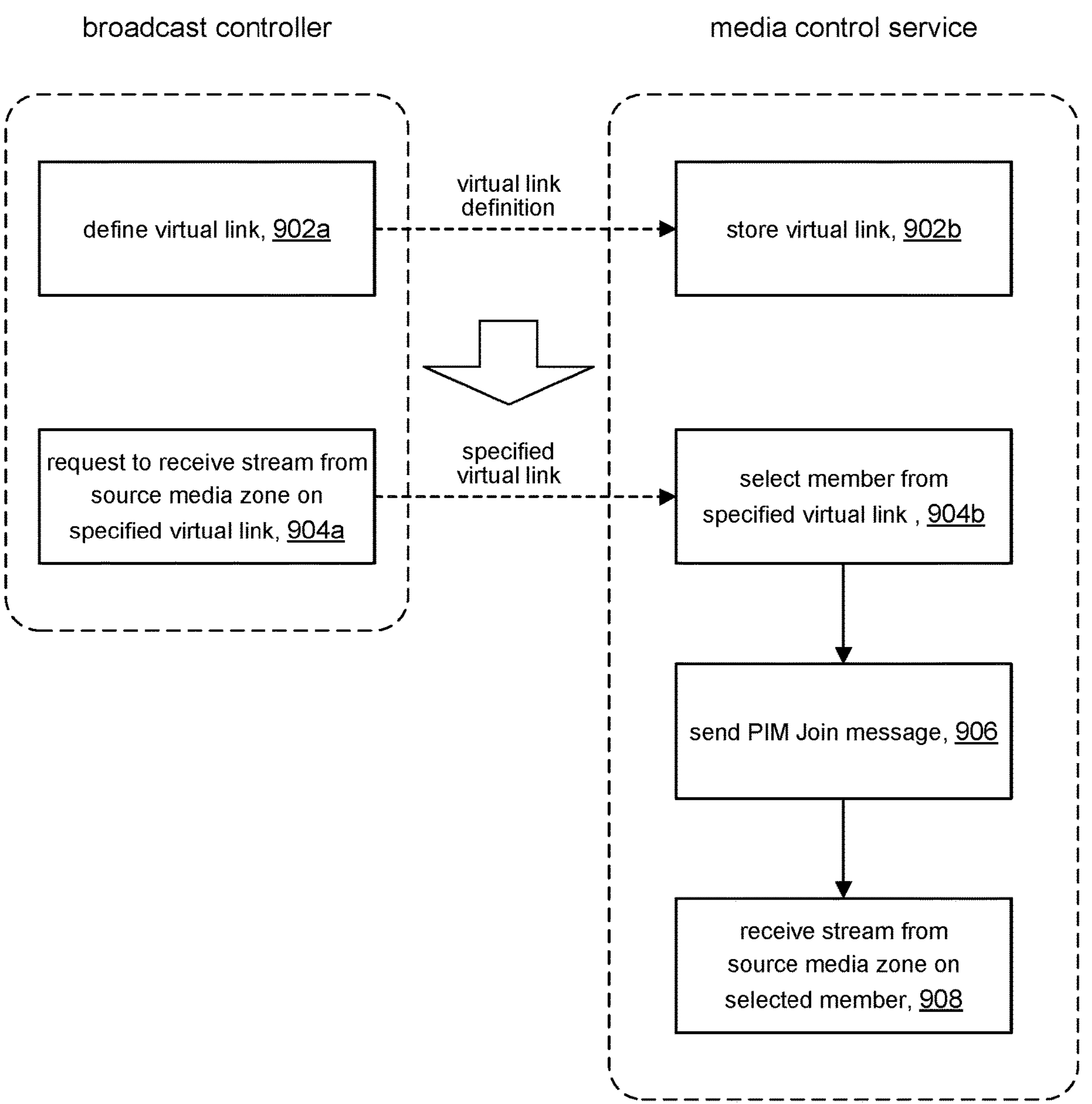
FIG. 9 represents processing for receiving a stream in accordance with some embodiments of the present disclosure.

Referring to FIG. 9, the discussion will now turn to a high level description of processing in a broadcast controller (BC) and a media control service (MCS) for receiving a stream from an IGMP/PIM-based media zone in accordance with the present disclosure. In some embodiments, for example, each of the BC and the MCS can include respective computer executable program code (e.g., stored on a non-transitory computer-readable storage memory device), which when executed by a respective processor (e.g., 502, FIG. 2), can cause the BC and MCS to perform respective processing in accordance with FIG. 9. The operation and processing blocks described below are not necessarily executed in the order shown. Operations can be combined or broken out into smaller operations in various embodiments. Operations can be allocated for execution among one or more concurrently executing processes and/or threads. The description will refer to the example IGMP/PIM configuration shown in FIGS. 6 and 7 to illustrate the operations.

Virtual Link Definition

At operation 902*a*, a broadcast controller in a media zone can receive input from a user in that media zone to define a virtual link to another zone. Consider, for example, a user in Zone 1. In some embodiments, the user can access BC 1 in Zone 1 to define a virtual link to Zone 2. The user can define a virtual link between Zone 1 and Zone 2 in terms of the physical links between Zone 1 and Zone 2. For example, the user can specify a virtual link, namely virtual link 1, comprising the physical links in Zone 1 that are connected to interfaces et/12 and et/13 (edge device 3*a*) and interface et/21 (edge device 3*b*). BC 1 can provide this virtual link definition to MCS 1.

At operation 902*b*, an MCS controller in the media zone can receive input, originating from a user, that defines a virtual link in accordance with the present disclosure. In our example, for instance, BC 1 can communicate the definition of virtual link 1 specified by the user to MCS 1. MCS 1 can store the received definition of virtual link 1 in a suitable data store, for example, virtual link list 306.

Virtual Link Utilization

At operation 904*a*, a user in the (receiving) media zone can make a request to the broadcast controller of the receiving media zone to receive a stream from another (source) media zone. In accordance with the present disclosure, the user need only specify a virtual link between the two media zones which represents two or more physical links between the two media zones. In our example, a user on BC 1 in Zone 1 can specify to receive a stream from Zone 2 over virtual link 1 by instructing MCS 1 to pull the stream from Zone 2 over virtual link 1. Here, virtual link 1 represents the physical links on interfaces et/12 and et/13 of edge device 3*a* and interface et/21 of edge device 3*b*.

At operation 904*b*, the MCS controller in the receiving media zone can receive the stream details and the user-specified virtual link from the broadcast controller, where the virtual link represents a group of physical links between the two media zones. In our example, for instance, MCS 1 receives from BC 1 the user-specified virtual link 1. In accordance with the present disclosure, MCS 1 in response can select one of the member physical links that constitute virtual link 1. In accordance with some embodiments, for example, MCS 1 can select a member from the group based on load-balancing criteria, including for example link bandwidth, number of streams on a given link, etc. For discussion purposes, suppose the selected physical link is the physical link connected to interface et/21 on edge device 3*b*.

At operation 906, the MCS controller in the receiving media zone can use the IGMP host proxy running on interface et/21 on edge device 3*b* to transmit a PIM Join message to PIM border router 5*b* to pull the specified stream on the corresponding physical link. The Join message will trigger the IGMP PIM subsystem in Zone 2 to deliver the specified stream on the specified link.

At operation 908, the specified stream can be received from the source media zone on the interface corresponding to the selected physical link, which in our use case is interface et/21 on edge device 3*b*.

FIG. 10 shows a data network 1000, sometimes referred to as a "super-spine," configured to operate in accordance with the present disclosure. Data network 1000 comprises first and second media zones 1002*a* (Zone 1), 1002*b* (Zone 2) and an intermediate network 1002*c* (IGMP/PIM super-spine). Zone 1 has one or more virtual links 1004*a* to the super-spine, configured in the same manner as illustrated in FIG. 7. Likewise, Zone 2 has one or more virtual links 1004*b* to the super-spine, configured as illustrated in FIG. 7.

Transmitting multimedia traffic from Zone 1 to Zone 2 can proceed per FIG. 8 as follows:

- Setup Zone 1 to super-spine connection
  - A user in Zone 1, via BC 1, can specify a stream (Stream A) for transmission and select one of the virtual links on which to transmit the specified stream.
  - BC 1 can request MCS 1 to set up a connection to the super-spine using the selected virtual link. MCS 1 can select one of the physical links that constitute the selected virtual link based on load-balancing criteria.
  - MCS 1 can register the selected physical link with the super-spine, informing the IGMP/PIM network to receive the specified stream from Zone 1 over the selected link.
- Setup Zone 2 to super-spine connection
  - A user in Zone 2, via BC 2, can specify to receive a stream (Stream A) and select one of the virtual links on which to receive the specified stream.
  - BC 2 can request MCS 2 to set up a connection to the super-spine using the selected virtual link. MCS 2 can select one of the physical links that constitute the selected virtual link based on load-balancing criteria.
  - MCS 2 can register the selected physical link with the super-spine, informing the IGMP/PIM network to transmit the specified stream over the selected link.
- Stream A from a (source) media endpoint in Zone 1 will be routed to the device/interface on which the MCS-selected member physical link of virtual link 1004*a* is connected for transmission to the super-spine. The super-spine will know to send Stream A to Zone 2 over the MCS-selected member physical link of virtual link 1004*b* where it can be routed to a (destination) media endpoint.

Further Examples

Features described above as well as those claimed below may be combined in various ways without departing from the scope hereof. The following examples illustrate some possible, non-limiting combinations:

(A1) A method in a zone controller in a first media zone, the method comprising the zone controller: receiving a virtual link specified by a user in the first zone, the user-specified virtual link representing a plurality of physical links between interfaces on one or more edge devices in the first zone and interfaces on one or more edge devices in a second media zone ("second zone"); selecting a physical link from among the plurality of physical links of the user-specified virtual link; informing a computer device in the second zone that the stream will be transmitted to the second zone over the selected physical link; and wherein a stream is transmitted from the first zone to the second zone on the selected physical link.

(A2) For the method denoted as (A1), the selected physical link is selected based on load-balancing traffic among the other physical links that are represented by the user-selected virtual link.

(A3) The method denoted as any of (A1) through (A2), further comprising receiving input from the user to define the user-specified virtual link, including input that specifies the one or more edge devices in the first zone and interfaces on those one or more edges devices.

(A4) The method denoted as any of (A1) through (A3), further comprising receiving input from the user that defines a plurality of virtual links between the first and second zones, wherein the user-specified virtual link is selected from the plurality of virtual links.

(A5) For the method denoted as any of (A1) through (A4), the computer device in the second zone is a broadcast controller, wherein informing the computer device in the second zone that the stream will be transmitted to the second zone over the selected physical link comprises: the zone controller in the first zone informing a broadcast controller in the first zone of the selected physical link; the broadcast controller in the first zone informing the broadcast controller in the second zone of the selected physical link; and the broadcast controller in the second zone informing the selected physical link to a zone controller in the second zone, wherein the zone controller in the second zone configures an edge device in the second zone to receive the stream in the selected physical link.

(A6) For the method denoted as any of (A1) through (A5), the computer device is a zone controller in the second zone, wherein the zone controller in the second zone configures an edge device in the second zone to receive the stream in the selected physical link.

(A7) For the method denoted as any of (A1) through (A6), the stream comprises traffic that originates from a media endpoint in the first zone and is destined for a media endpoint in the second zone.

(B1) A computer device in a first media zone ("first zone"), the computer device comprising: one or more computer processors; and a computer-readable storage device comprising instructions for controlling the one or more computer processors to: receive a virtual link specified by a user in the first zone on which to transmit a stream, the user-specified virtual link representing a plurality of physical links between interfaces on one or more edge devices in the first zone and interfaces on one or more edge devices in a second media zone ("second zone"); select a physical link from among the plurality of physical links that constitute the user-specified virtual link, wherein the selected physical link connects an edge device in the first zone with an edge device in the second zone; and initiate transmission of the stream from the first zone to the second zone on the selected physical link.

(B2) For the computer device denoted as (B1), the edge device in the second zone forwards the stream received from the first zone to a destination in the second zone as traffic originating in the second zone.

(B3) For the computer device denoted as any of (B1) through (B2), the second zone is based on Internet Group Management Protocol (IGMP), wherein the edge device in the second zone is configured with Protocol Independent Multicast (PIM) border router functionality.

(B4) For the computer device denoted as any of (B1) through (B3), the selected physical link is selected based on load-balancing traffic among the other physical links that are represented by the user-selected virtual link.

(B5) For the computer device denoted as any of (B1) through (B4), the computer-readable storage device further comprises instructions for controlling the one or more computer processors to receive input from the user that defines the user-specified virtual link, including receiving input from the user that specifies the one or more edge devices in the first zone and interfaces on those one or more edges devices.

(B6) For the computer device denoted as any of (B1) through (B5), the computer-readable storage device further comprises instructions for controlling the one or more computer processors to receive input from the user that defines a plurality of virtual links between the first and second zones, wherein the user-specified virtual link is selected from the plurality of virtual links.

(B7) For the computer device denoted as any of (B1) through (B6), the stream comprises traffic that originates from a media endpoint in the first zone and is destined for a media endpoint in the second zone.

(C1) A non-transitory computer-readable storage device in a computer device in a first media zone ("first zone"), the non-transitory computer-readable storage device having stored thereon computer executable instructions, which when executed, cause the computer device to: receive a virtual link specified by a user in the first zone on which to receive a stream from a second media zone ("second zone"), the user-specified virtual link representing a plurality of physical links between interfaces on one or more edge devices in the first zone and interfaces on one or more edge devices in the second zone; select a physical link from among the plurality of physical links of the user-specified virtual link; and inform a computer device in the second zone to transmit the stream over the selected physical link, wherein the stream is transmitted from the second zone to the first zone on the selected physical link.

(C2) For the non-transitory computer-readable storage device denoted as (C1), the computer device in the second zone is an edge device, wherein informing the computer device in the second zone to transmit the stream over the selected physical link comprises the computer device causing an edge device in the first zone to register information about the selected physical link to the edge device in the second zone.

(C3) For the non-transitory computer-readable storage device denoted as any of (C1) through (C2), the second zone is based on IGMP, wherein the edge device in the second zone is enabled with PIM border router functionality.

(C4) For the non-transitory computer-readable storage device denoted as any of (C1) through (C3), the selected physical link is selected based on load-balancing traffic among the other physical links that are represented by the user-selected virtual link.

(C5) For the non-transitory computer-readable storage device denoted as any of (C1) through (C4), the computer executable instructions, which when executed, further cause the computer device to receive input from the user that defines the user-specified virtual link, including receiving input from the user that specifies the one or more edge devices in the first zone and interfaces on those one or more edges devices.

(C6) For the non-transitory computer-readable storage device denoted as any of (C1) through (C5), the computer executable instructions, which when executed, further cause the computer device to receive input from the user that defines a plurality of virtual links between the first and second zones, wherein the user-specified virtual link is selected from the plurality of virtual links.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a zone controller in a first media zone (first zone), the method comprising the zone controller:

receiving from a user in a first zone a request to transmit a stream, the request including a link identifier specified by the user, the user-specified link identifier representing a plurality of physical links between a set of edge devices in the first zone and a set of corresponding edge devices in a second media zone ("second zone");

selecting a physical link from among the plurality of physical links represented by the user-specified link identifier based on criteria comprising one or more of load-balancing criteria, device identifier, flow prioritization, and quality of service;

informing a computer device in the second zone that the stream will be transmitted to the second zone over the selected physical link; and wherein the stream is transmitted from the first zone to the second zone on the selected physical link.

2. The method of claim 1, wherein the selected physical link is selected based on load-balancing traffic among the other physical links that are represented by the user-specified virtual link.

3. The method of claim 1, further comprising receiving input from the user to define the user-specified link identifier, including input that specifies the edge devices in the first zone and interfaces on those edges devices.

4. The method of claim 1, further comprising receiving input from the user that defines a plurality of link identifiers between the first and second zones, wherein the user-specified link identifier is selected from the plurality of link identifiers.

5. The method of claim 1, wherein the computer device in the second zone is a broadcast controller, wherein informing the computer device in the second zone that the stream will be transmitted to the second zone over the selected physical link comprises:

the zone controller in the first zone informing a broadcast controller in the first zone of the selected physical link;

the broadcast controller in the first zone informing the broadcast controller in the second zone of the selected physical link; and the broadcast controller in the second zone informing the selected physical link to a zone controller in the second zone, wherein the zone controller in the second zone configures an edge device in the second zone to receive the stream in the selected physical link.

6. The method of claim 1, wherein the computer device is a zone controller in the second zone, wherein the zone controller in the second zone configures an edge device in the second zone to receive the stream in the selected physical link.

7. The method of claim 1, wherein the stream comprises traffic that originates from a media endpoint in the first zone and is destined for a media endpoint in the second zone.

8. A computer device in a first media zone ("first zone"), the computer device comprising:

one or more computer processors; and a computer-readable storage device comprising instructions for controlling the one or more computer processors to:

receive from a user in a first zone a request to transmit a stream, the request including a link identifier specified by the user, the link identifier representing a plurality of physical links between a plurality of edge devices in the first zone and a plurality of edge devices in a second media zone ("second zone");

select a physical link from among the plurality of physical links that constitute the user-specified link identifier based on criteria comprising one or more of load-balancing criteria, device identifier, flow prioritization, and quality of service, wherein the selected physical link connects an edge device in the first zone with an edge device in the second zone; and initiate transmission of the stream from the first zone to the second zone on the selected physical link.

9. The computer device of claim 8, wherein the edge device in the second zone forwards the stream received from the first zone to a destination in the second zone as traffic originating in the second zone.

10. The computer device of claim 8, wherein the second zone is based on Internet Group Management Protocol (IGMP), wherein the edge device in the second zone is configured with Protocol Independent Multicast (PIM) border router functionality.

11. The computer device of claim 8, wherein the selected physical link is selected based on load-balancing traffic among the other physical links that are represented by the user-selected virtual link.

12. The computer device of claim 8, wherein the computer-readable storage device further comprises instructions for controlling the one or more computer processors to receive input from the user that defines the user-specified link identifier, including receiving input from the user that specifies the plurality of edge devices in the first zone and interfaces on those edges devices.

13. The computer device of claim 8, wherein the computer-readable storage device further comprises instructions for controlling the one or more computer processors to receive input from the user that defines a plurality of link identifiers between the first and second zones, wherein the user-specified link identifier is selected from the plurality of link identifiers.

14. The computer device of claim 8, wherein the stream comprises traffic that originates from a media endpoint in the first zone and is destined for a media endpoint in the second zone.

15. A non-transitory computer-readable storage device in a computer device in a first media zone ("first zone"), the non-transitory computer-readable storage device having stored thereon computer executable instructions, which when executed, cause the computer device to:

receive from a user in a first zone a request to receive a stream from a second media zone ("second zone"), the request including a link identifier specified by the user representing a plurality of physical links between a plurality of edge devices in the first zone and a plurality of edge devices in the second zone;

select a physical link from among the plurality of physical links of the user-specified link identifier based on criteria comprising one or more of load-balancing criteria, device identifier, flow prioritization, and quality of service; and inform a computer device in the second zone to transmit the stream over the selected physical link, wherein the stream is transmitted from the second zone to the first zone on the selected physical link.

16. The non-transitory computer-readable storage device of claim 15, wherein the computer device in the second zone is an edge device, wherein informing the computer device in the second zone to transmit the stream over the selected physical link comprises the computer device causing an edge device in the first zone to register information about the selected physical link to the edge device in the second zone.

17. The non-transitory computer-readable storage device of claim 16, wherein the second zone is based on IGMP, wherein the edge device in the second zone is enabled with PIM border router functionality.

18. The non-transitory computer-readable storage device of claim 15, wherein the selected physical link is selected based on load-balancing traffic among the other physical links that are represented by the user-selected virtual link.

19. The non-transitory computer-readable storage device of claim 15, wherein the computer executable instructions, which when executed, further cause the computer device to receive input from the user that defines the user-specified link identifier, including receiving input from the user that specifies the plurality of edge devices in the first zone and interfaces on those edges devices.

20. The non-transitory computer-readable storage device of claim 15, wherein the computer executable instructions, which when executed, further cause the computer device to receive input from the user that defines a plurality of link identifiers between the first and second zones, wherein the user-specified link identifier is selected from the plurality of link identifiers.

* * * * *